US009876565B2

(12) United States Patent
Levy

(10) Patent No.: US 9,876,565 B2
(45) Date of Patent: Jan. 23, 2018

(54) CONTROL OF COMMUNICATION NETWORK PERFORMANCE BY VARYING ACTIVE OPTICAL CABLE PARAMETERS

(71) Applicant: Mellanox Technologies Ltd., Yokneam (IL)

(72) Inventor: Shmuel Levy, Kyriat Tivon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/092,637

(22) Filed: Apr. 7, 2016

(65) Prior Publication Data

US 2016/0226579 A1 Aug. 4, 2016

Related U.S. Application Data

(63) Continuation-in-part of application No. 14/222,887, filed on Mar. 24, 2014, now abandoned.

(51) Int. Cl.
*H04B 10/077* (2013.01)
*H04B 10/079* (2013.01)
*H04B 10/25* (2013.01)

(52) U.S. Cl.
CPC ..... *H04B 10/0795* (2013.01); *H04B 10/0773* (2013.01); *H04B 10/0793* (2013.01); *H04B 10/25* (2013.01)

(58) Field of Classification Search
CPC ............ H04B 10/0795; H04B 10/0793; H04B 10/0773; H04B 10/25
See application file for complete search history.

(56) References Cited

U.S. PATENT DOCUMENTS

| 2003/0088799 | A1* | 5/2003 | Bodas | G06F 1/206 713/320 |
| 2008/0119140 | A1* | 5/2008 | Maligeorgos | H04B 15/02 455/67.13 |
| 2010/0128344 | A1* | 5/2010 | Lichtman | H04B 10/294 359/337.4 |
| 2010/0166421 | A1* | 7/2010 | Hashiguchi | H04B 10/0793 398/26 |
| 2013/0318385 | A1* | 11/2013 | Miller | G06F 1/32 713/323 |
| 2015/0016819 | A1* | 1/2015 | Piciaccia | H04B 10/0793 398/37 |

* cited by examiner

*Primary Examiner* — Leslie Pascal
(74) *Attorney, Agent, or Firm* — D. Kligler IP Services Ltd.

(57) ABSTRACT

A method includes defining a target performance for a communication network that includes multiple network nodes interconnected by Active Optical Cables (AOCs). Respective parameters, which cause the communication network to achieve the target performance, are selected for the AOCs. Commands are sent to the AOCs to set the selected parameters.

21 Claims, 3 Drawing Sheets

CONTROL OF COMMUNICATION NETWORK PERFORMANCE BY VARYING ACTIVE OPTICAL CABLE PARAMETERS

CROSS-REFERENCE TO RELATED APPLICATION

This application is a continuation-in-part of U.S. patent application Ser. No. 14/222,887, filed Mar. 24, 2014, which is incorporated herein by reference.

FIELD OF THE INVENTION

The present invention relates generally to communication networks, and particularly to management of communication network performance.

BACKGROUND OF THE INVENTION

Various communication and computing systems, such as High performance computing (HPC) systems, often use optical interconnects to route high data rate signals. Many such systems, such as high speed storage systems (e.g., data centers) require high bandwidth, low latency connections between system nodes, goals that can be achieved by using optical interconnects such as active optical cables (AOCs).

SUMMARY OF THE INVENTION

An embodiment of the present invention provides a method including defining a target performance for a communication network that includes multiple network nodes interconnected by Active Optical Cables (AOCs). Respective parameters, which cause the communication network to achieve the target performance, are selected for the AOCs. Commands are sent to the AOCs to set the selected parameters.

In some embodiments, selecting the parameters includes receiving from the AOCs reports that are indicative of respective performance metrics of the AOCs, and choosing the parameters based on the reported performance metrics. In other embodiments, selecting the parameters includes assessing a current performance of the communication network based on the reported performance metrics, and choosing the parameters so as to adjust the current performance to the target performance.

In some embodiments, assessing the current performance includes receiving an indication of a failure in one or more of the AOCs, and choosing the parameters includes compensating for the failure. In other embodiments, assessing the current performance includes receiving an indication of a crosstalk between signals in one or more of the AOCs, and choosing the parameters includes compensating for the crosstalk.

In some embodiments, defining the target performance includes defining a target power consumption for the communication network. In other embodiments, defining the target performance includes defining a target latency for the communication network.

In some embodiments, selecting the parameters includes choosing transmission power levels for respective optical sources in the AOCs. In other embodiments, selecting the parameters includes choosing reception sensitivities for respective optical detectors in the AOCs. In yet other embodiments, selecting the parameters includes choosing respective communication bandwidths for the AOCs.

In some embodiments, defining the target performance includes alternating between at least first and second different target performances at respective first and second times.

There is also provided, in accordance with an embodiment of the present invention, an apparatus including a processor and an interface. The processor is configured to define a target performance for a communication network that includes multiple network nodes interconnected by Active Optical Cables (AOCs), and to select for the AOCs respective parameters that cause the communication network to achieve the target performance. The interface is configured to send commands to the AOCs to set the selected parameters.

There is also provided, in accordance with an embodiment of the present invention, a method including, in an Active Optical Cable (AOC) that includes one or more optical fibers, first and second transceiver modules that are coupled to respective ends of the optical fibers, and optical transducers in the transceiver modules for exchanging optical signals over the optical fibers, receiving a command from a network manager external to the AOC. One or more parameters of the optical transducers are set in response to the command.

There is also provided, in accordance with an embodiment of the present invention, an Active Optical Cable (AOC) including one or more optical fibers and first and second transceiver modules. The first and second transceiver modules are coupled to respective ends of the optical fibers. At least one of the transceiver modules includes optical transducers for exchanging optical signals over the optical fibers and circuitry. The circuitry is configured to receive a command from a network manager external to the AOC, and to set one or more parameters of the optical transducers in response to the command.

The present invention will be more fully understood from the following detailed description of the embodiments thereof, taken together with the drawings in which:

DETAILED DESCRIPTION OF EMBODIMENTS

Overview

In data communication networks, such as in large scale data centers, multiple servers or other network nodes are connected to each other through multiple switches that route the data through the network. Optical interconnects, such as active optical cables (AOCs), are often used as high speed interconnects between the switches to route data throughout the network.

Embodiments of the present invention that are described hereinbelow provide improved methods and systems for controlling the performance of communication networks by varying AOC parameters.

In some embodiments, a communication network comprises multiple nodes that are interconnected by AOCs. A network management unit, referred to herein as a network manager, defines a target system performance for the communication network. The network manager receives reports indicative of performance metrics of multiple active optical cables in the network. The network manager assesses the current system performance based on the reported performance metrics of the AOCs. When appropriate, the network manager sends commands that instruct one or more of the AOCs to change their performance parameters in order to achieve the target system performance.

Various AOC parameters can be varied in order to modify the overall system performance. Example parameters include the optical transmit power of optical sources, and the sensitivity of optical detectors. By changing AOC parameters, the network manager can modify the system performance and set different trade-offs between data rate (bandwidth), reliability, energy consumption and latency, for example.

In some embodiments, the network manager uses the disclosed techniques to set different target system performances at different times. For example, the system can be set for minimum power over the weekend and minimum latency on weekdays. In other embodiments, the network manager uses the disclosed techniques to react to changes in the system, e.g., to failure or performance degradation in network links or nodes.

System Description

Figure 1:
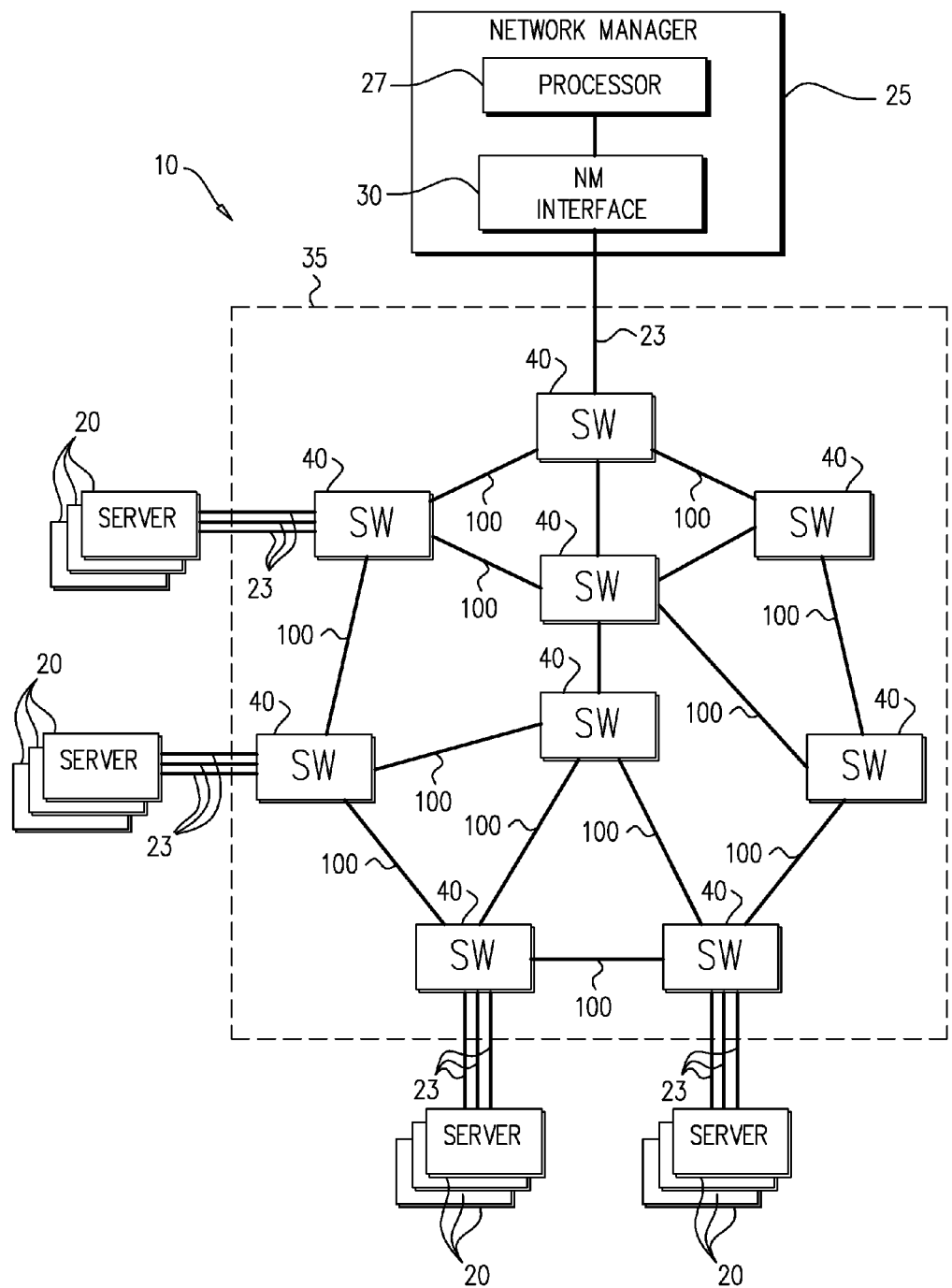
FIG. 1 is a block diagram that schematically illustrates a communication network, in accordance with an embodiment of the present invention.

FIG. 1 is a block diagram that schematically illustrates a communication network 10, in accordance with an embodiment of the present invention. In the example of FIG. 1, multiple servers 20 are connected to data switches 40 using links 23. Switches 40 may be arranged in any suitable switch topology 35, e.g., a Clos or fat-tree topology. Multiple active optical cables (AOC) 100 are used to connect switches 40 so as to configure switch topology 35. System 10 may comprise, for example, a data center.

Network 10 shown in FIG. 1 comprises redundant, non-blocking data paths among switches 40 connected by AOCs 100. AOCs 100 are also referred to as network links. Data relayed among servers 20 may traverse different paths between different switches 40 in the configuration shown in switch topology 35. Thus, if a particular AOC or switch is malfunctioning on one data path, the data can still be forwarded over a different path.

A network manager (NM) 25, comprising a processor 27, is connected into the network via a NM interface 30. NM 25 typically receives reports via NM interface 30 regarding performance metrics over various links in the network, such as bit error rate (BER), for example. NM 25 may maintain tables stored in a memory with the descriptors, or performance metrics, of AOCs 100 in system 10 such as BER tables, for example. Processor 27 is configured to assess the current system performance based on the performance metrics over each of the data paths (e.g., different paths through the switches and AOCs). When needed, NM 25 may send messages over network 10 via NM interface 30 for managing and controlling the different elements in network 10, such as switches 40 and AOCs 100.

The configuration of communication network 10 shown in FIG. 1 is merely for conceptual clarity and not by way of limitation of the embodiments of the present invention. Any suitable number of servers, switches, and other nodes in any topological configuration may be used. Links 23 may comprise any suitable electrical link or AOC. System 10 may be part of an InfiniBand fabric architecture used in data centers. NW 25 may run on one of servers 20, on a management workstation, on one of switches 40, or on any other suitable platform.

Active Optical Cables

Figure 2A:
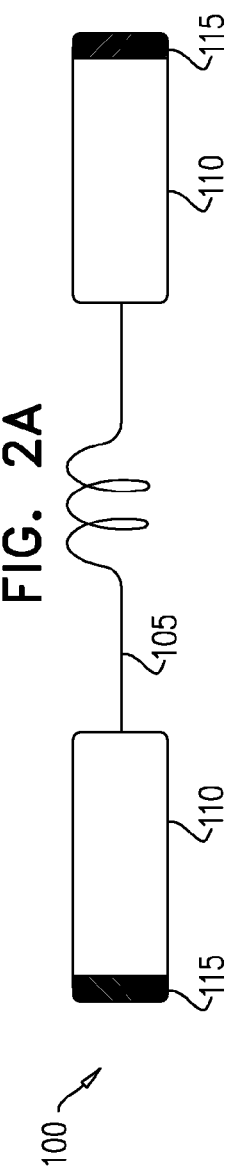
FIGS. 2A and 2B are block diagrams that schematically illustrate an active optical cable, in accordance with an embodiment of the present invention.

FIG. 2A is a block diagram that schematically illustrates active optical cable 100, in accordance with an embodiment of the present invention. AOC 100 comprises one or more optical fibers 105, and two optical transceiver modules 110 that terminate the respective ends of fibers 105. Each optical transceiver module 110 comprises a high speed electronic connector 115. Connectors 115 may comprise Quad Small Form-Factor Pluggable (QSFP) connectors, small form factor (SFP) connectors, CXP connectors, or any other suitable high speed connector.

Figure 2B:
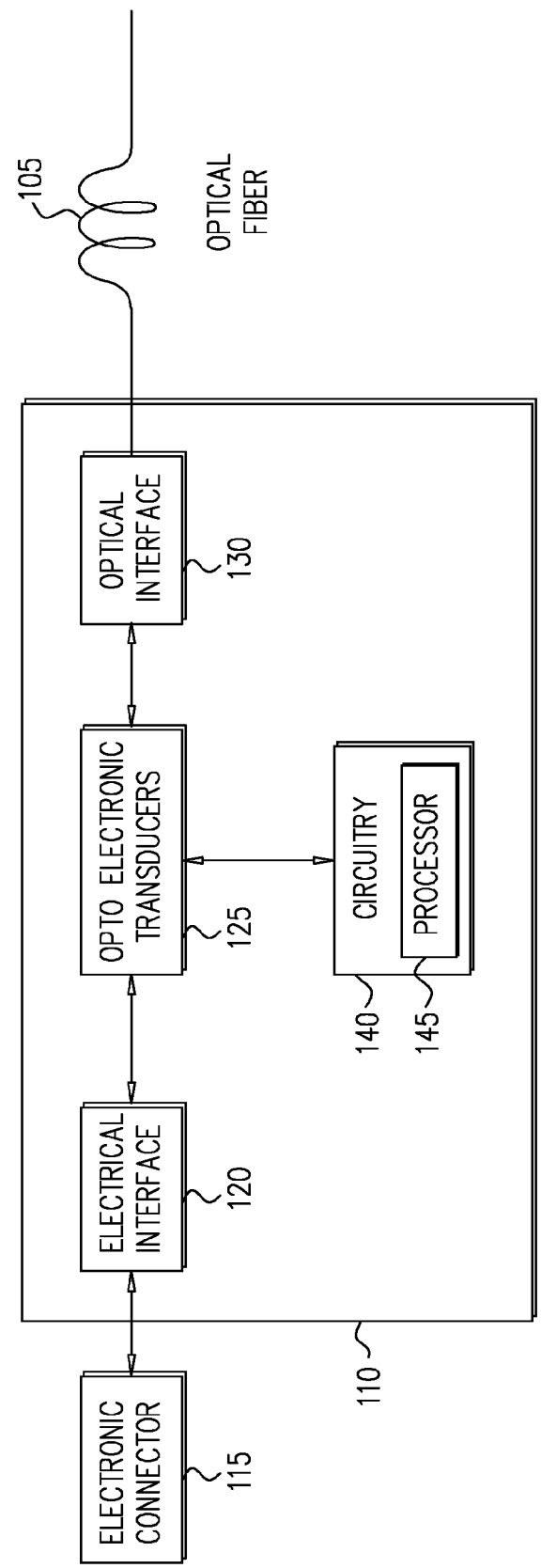

FIG. 2B is a block diagram that schematically illustrates optical transceiver module 110, in accordance with an embodiment of the present invention. High data rate electrical signals traverse connector 115 in both directions, and are coupled via an electrical interface 120 to optoelectronic transducers 125, where the electrical signals are converted into optical signals, and vice versa. Through a bidirectional optical interface 130, the optical signals are coupled to optical fibers 105. The optical signals traverse the fibers, and are then converted back to electrical signals at the other end of fiber 105 by module 110. The power consumption of a typical active optical cable (e.g., the power consumption of two transceiver modules 110) is typically on the order of 3 watts.

Optical, or optoelectronic, transducers 125 may comprise vertical cavity surface emitting lasers (VCSELs), or any suitable optoelectronic transmitter, or source, which converts electrical signals to optical signals. Similarly, optoelectronic transducers 125 may also comprise photodiodes (PDs), or any suitable optical detectors for converting optical to electrical signals.

Transceiver circuitry 140 comprises an optical transceiver (OT) processor 145 and circuitry for controlling optoelectronic transducers 125, such as for example, biasing and driver circuitry, current and voltage stabilizing circuitry, as well as equalizers and clocking circuitry.

Circuitry 140 can be used to control performance metrics in AOC 100, such as current consumption, data rate (bandwidth), and BER (e.g., circuitry 140 controls and sets one or more parameters of optoelectronic transducers 125). For example, NM 25 can choose transmission power levels for the optical sources in AOCs 100. The VCSEL optical transmit power can be varied by changing parameters in the biasing and driver circuitry driving the VCSEL devices. Similarly, NM 25 can choose reception sensitivities for the optical detectors. The BER can be reduced by increasing the photodiode receiver sensitivity.

In other words, circuitry 140 in a given AOC 100 is configured to receive from NM 25 commands that instruct the circuitry to set one or more parameters of the AOC. In response to receiving such a command, circuitry 140 sets the AOC parameters (e.g., VCSEL transmit power, PD sensitivity or bandwidth) as instructed.

Circuitry 140 may be implemented, for example, using a Field-Programmable Gate Array (FPGA) or Application-Specific Integrated Circuit (ASIC). NM processor 27 and/or OT processor 145 may comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

The embodiments shown in FIGS. 2A and 2B are merely for conceptual clarity and not by way of limitation of embodiments of the present invention. Any suitable optical transceiver configuration can be used and is not limited to the elements shown in the block diagram of FIG. 2B. Moreover, AOC 100 is not limited to having identical optical transceiver modules 110 at both sides of fiber 105.

Control of Network Performance by Varying Active Optical Cable Parameters

In the embodiments of the present invention described herein, network manager 25 defines a target performance trade-off for system 10. Optionally, the target trade-off indicates a target threshold of one or more transmission performance parameters, such as BER, latency or data rate. For example, the performance trade-off may indicate that the average latency is to be lower than a specific threshold. Alternatively or additionally, the performance trade-off indicates that the BER is to be lower than a specific threshold value, e.g., lower than $10^{-15}$.

Alternatively or additionally, target trade-off indicates a maximal power consumption for system 10 and/or an average power consumption of the AOCs. Further alternatively or additionally, the target trade-off indicates a maximal value of a function of both the power consumption and one or more performance parameters. Such a function may require, for example, that a power consumption of system 10 must be below a threshold value, unless the gain in performance is substantially above a given value. Any other suitable trade-off can also be set.

In some embodiments, network manager 25 may decide to alternate between at least first and second different target performance trade-offs at different times. For example, during the weekdays when many users are using system 10, network manager 25 may decide to optimize the system for low BER and low latency. During weekends, on the other hand, the network manager may decide to reduce power consumption at the expense of latency or quality (e.g., BER).

In a typical flow, NM 25 receives from the AOCs reports that are indicative of the respective performance metrics of the AOCs. NM 25 selects respective parameters of the AOCs so as to adjust the current system performance to reach the defined target performance. Stated differently, the different target performances of system 10 (e.g., bandwidth, reliability, power consumption and/or latency) are achieved by changing the parameters of the various AOCs in the system. In this manner, the network manager can optimize the target system performance depending on current system conditions. In some embodiments of the invention, the optimization involves minimizing the power consumption, while the defined target is met. In other embodiments, the optimization involves maximizing performance (e.g., minimizing BER and/or latency) while the defined target is met. In still other embodiments, the optimization involves minimizing or maximizing a cost function of both the power consumption and one or more quality measures. Optionally, different cost functions may be used for different times. For example, during weekdays the cost function used may give more weight to performance, while during weekends the cost function gives more weight to power consumption.

In some embodiments, the constraints and/or cost function are defined over an efficiency function which depends on a ratio between power consumption and transmission performance.

In various embodiments, AOCs 100 and NM 25 may communicate in different ways. In one embodiment, circuitry 140 in AOCs 100 communicates with NM 25 over the existing physical media of system 10 (i.e., via the AOC and switches 40), e.g., using a separate logical channel. This logical channel is used for sending descriptors (i.e., reports of performance metrics) from the AOC to the NM, and for receiving commands from the NM to the AOC. Alternatively, any other suitable communication means can be used for communicating between NM 25 and circuitry 140 of AOCs 100.

Figure 3:
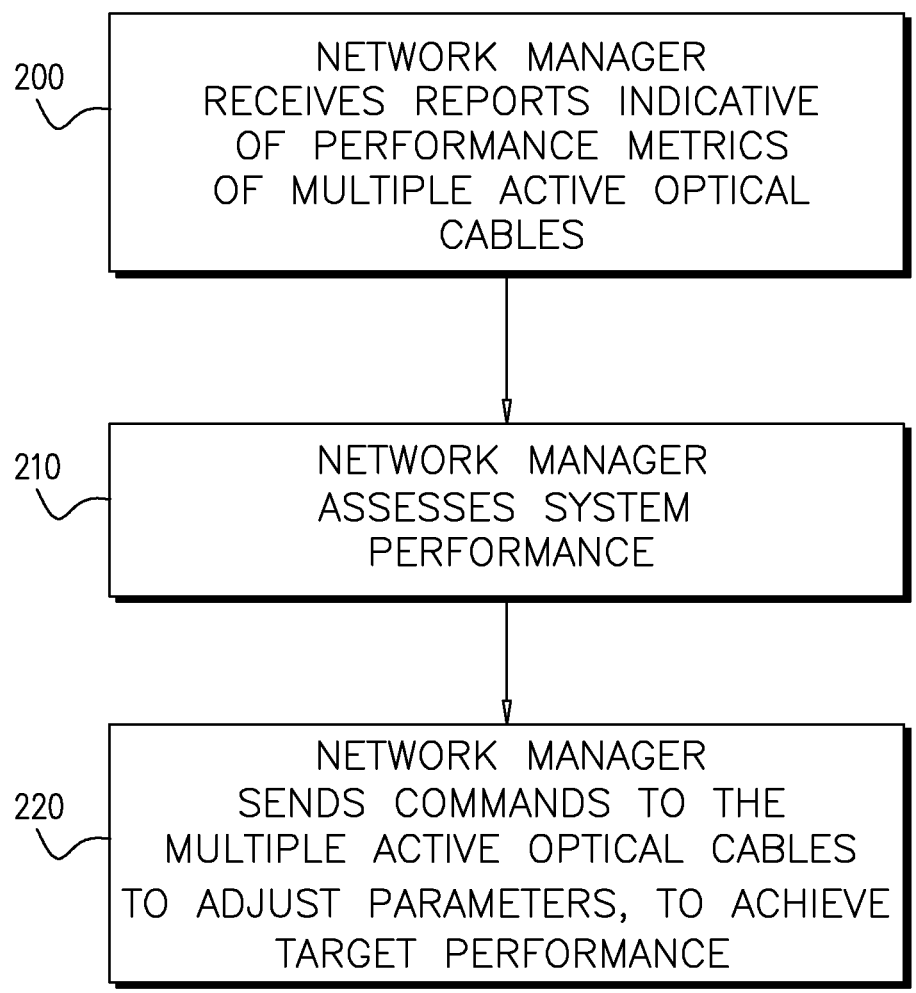
FIG. 3 is a flow chart that schematically illustrates a method for controlling communication network performance by adjusting parameters of active optical cables, in accordance with an embodiment of the present invention.

FIG. 3 is a flow chart that schematically illustrates a method for controlling network performance by adjusting parameters in active optical cables 100, in accordance with an embodiment of the present invention. In a receiving step 200, network manager 25 receives reports indicative of performance metrics of multiple active optical cables 100 in system 10.

In some embodiments, circuitry 140 of each AOC 100 may be configured to measure the BER in the AOC, which then can be reported to network manager 25 over the network. In other embodiments, circuitry 140 of each AOC 100 may be configured to measure the temperature of the AOC (e.g., of two transceiver modules 110), which can be then reported back to network manager 25.

In some embodiments, network manager 25 may store tables with the performance metrics of each AOC 100 in system 10. For example, network manager 25 may store a BER table for each AOC. In yet other embodiments, network manager 25 may periodically assess, or sample, the performance metrics of each AOC in system 10. In an assessing step 210, network manager 25 assesses the current performance of system 10 based on the received performance metrics of the AOCs. NM processor then decides if any AOC parameters need to be adjusted to reach the target system performance.

In some embodiments, network manager 25 may detect a failure, or severe performance degradation, in one or more of the AOCs in step 210 and decide to compensate the degraded AOC such as by enhancing the performance of specific AOCs along a different data path in system 10, for example, and/or switch off the degraded AOCs. In this manner, system reliability is maintained throughout the network.

In other embodiments, NM 25 defines a target BER and receives an indication in step 210 that the BER in one or more of the AOCs exceeds a target BER value such as BER>$10^{-15}$. NM 25 may take steps to change the performance metrics of the one or more degraded AOCs to reduce the BER of the one or more AOCs. In yet other embodiments, NM 25 may assess in step 210 the presence of crosstalk between one or more fibers in an AOC, and take steps to compensate for the crosstalk by changing AOC parameters such as, for example, by reducing the optical transmit power of the optical source (e.g., the VCSEL optical transmit power).

In a sending step 220, network manager 25 sends commands to multiple active cables 100 to adjust the parameters of one or more of the AOCs so as to reach the target performance. Typically, OT processor 145 receives commands from network manager 25. In response to the command, circuitry 140 in optical transceiver module 110 in AOC 100 sets one or more parameters in optical transducers 125. The changes in the parameters result in an adjustment of the performance metrics of each AOC which is used to readjust the current system performance to achieve the target system performance as assessed in step 210.

The method of FIG. 3 describes a closed-loop scheme in which NM 25 adjusts the system performance in response to performance metrics reported by the AOCs. In alternative embodiments, however, NM may operate in an open-loop manner. For example, NM 25 may alternate between two (or more) predefined sets of AOC parameters, e.g., between a daytime configuration and a night-time configuration, or a weekday configuration and a weekend configuration. This alternation may be performed without relying on reports from the AOCs.

Although the embodiments described herein mainly address data communication networks such as in large scale data centers, the methods and systems described herein can also be used in other applications, such as in wireless multi-communication networks, wireless local area networks (WLAN), and cellular networks.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    defining a plurality of target trade-off functions, for respective time periods, wherein the trade-off functions define a relation between an overall transmission performance parameter and power consumption, for a communication network that includes multiple network nodes interconnected by a plurality of Active Optical Cables (AOCs);
    periodically receiving, by a network manager processor, current performance metrics of the plurality of AOCs;
    selecting for the AOCs, by the network manager processor, respective operation parameters responsive to the received current performance metrics and the defined target trade-off function defined for a current time period;
    sending commands from the network manager processor to one or more of the AOCs to set the selected operation parameters; and
    setting the AOCs to the selected operation parameters in the sent commands.

2. The method according to claim 1, wherein the respective operation parameter of at least one of the AOCs is selected responsively to the performance metrics of a plurality of AOCs.

3. The method according to claim 1, wherein selecting the operation parameters comprises assessing a current value of the overall transmission performance parameter of the communication network based on the reported performance metrics, and choosing the operation parameters so as to adjust the current performance to the target trade-off function defined for the current time period.

4. The method according to claim 3, wherein receiving current performance metrics comprises receiving an indication of a failure in one or more of the AOCs, and wherein choosing the operation parameters comprises compensating for the failure by enhancing performance of an AOC on a path different from the path on the AOC for which the failure was indicated.

5. The method according to claim 3, wherein assessing the current value of the overall transmission performance parameter comprises receiving an indication of a crosstalk between signals in one or more of the AOCs, and wherein choosing the operation parameters comprises compensating for the crosstalk.

6. The method according to claim 1, wherein the target trade-off functions define a target latency for the communication network and require minimization of power consumption for the target latency.

7. The method according to claim 1, wherein selecting the operation parameters comprises choosing transmission power levels for respective optical sources in the AOCs.

8. The method according to claim 1, wherein selecting the operation parameters comprises choosing reception sensitivities for respective optical detectors in the AOCs.

9. The method according to claim 1, wherein selecting the operation parameters comprises choosing respective communication bandwidths for the AOCs.

10. The method according to claim 1, wherein selecting the operation parameters comprises selecting parameters that minimize power consumption within the defined target trade-off.

11. The method according to claim 1, wherein selecting the operation parameters comprises selecting parameters that minimize latency or bit error rate (BER) within the defined target trade-off.

12. The method according to claim 1, wherein the target trade-off functions define a target bit error rate (BER) for the communication network and require minimization of power consumption for the target BER.

13. The method according to claim 1, wherein the target trade-off functions define a target data rate for the communication network and require minimization of power consumption for the target data rate.

14. An apparatus, comprising:
    a processor, which is configured to define a plurality of target trade-off functions, for respective time periods, wherein the trade-off functions define a relation between an overall transmission performance parameter and power consumption for a communication network that includes multiple network nodes interconnected by Active Optical Cables (AOCs), to periodically receive current performance metrics of the AOCs, and to select for the AOCs respective operation parameters responsive to the received current performance metrics and the defined target trade-off function defined for a current time period; and
    an interface, which is configured to send commands to the AOCs to set the selected operation parameters.

15. The apparatus according to claim 14, wherein the processor is configured to assess a current value of the overall transmission performance parameter of the communication network based on the reported performance metrics, and to choose the operation parameters so as to adjust the current performance to the target trade-off function defined for the current time period.

16. The apparatus according to claim 15, wherein the processor is configured to receive an indication of a failure in one or more of the AOCs, and to choose the operation parameters so as to compensate for the failure by enhancing performance of an AOC on a path different from the path on the AOC for which the failure was indicated.

17. The apparatus according to claim 15, wherein the processor is configured to receive an indication of a crosstalk between signals in one or more of the AOCs, and to choose the operation parameters so as to compensate for the crosstalk.

18. The apparatus according to claim 14, wherein the processor is configured to define the target trade-off functions by defining a target latency for the communication network and requiring minimization of power consumption for the target latency.

19. The apparatus according to claim 14, wherein the processor is configured to select the operation parameters by choosing transmission power levels for respective optical sources in the AOCs.

20. The apparatus according to claim 14, wherein the processor is configured to select the operation parameters by choosing reception sensitivities for respective optical detectors in the AOCs.

21. The apparatus according to claim 14, wherein the processor is configured to select the operation parameters by choosing respective communication bandwidths for the AOCs.

* * * * *